(12) United States Patent
Chen et al.

(10) Patent No.: US 12,502,384 B2
(45) Date of Patent: Dec. 23, 2025

(54) PHARMACEUTICAL COMPOSITION CONTAINING NITROXOLINE PRODRUG, AND PREPARATION METHOD AND APPLICATION THEREFOR

(71) Applicants: Jiangsu Yahong Meditech Co., Ltd., Jiangsu (CN); Asieris Pharmaceuticals (Shanghai) Co., Ltd., Shanghai (CN)

(72) Inventors: Jie Chen, Jiangsu (CN); Shuai Shen, Jiangsu (CN); Youbin Wu, Jiangsu (CN); Jianghua Liu, Jiangsu (CN); Yushen Guo, Shanghai (CN)

(73) Assignees: Jiangsu Yahong Meditech Co., Ltd., Jiangsu (CN); Asieris Pharmaceuticals (Shanghai) Co., Ltd., Shanghai (CN)

( * ) Notice: Subject to any disclaimer, the term of this patent is extended or adjusted under 35 U.S.C. 154(b) by 526 days.

(21) Appl. No.: 17/999,470

(22) PCT Filed: May 26, 2021

(86) PCT No.: PCT/CN2021/096037
§ 371 (c)(1),
(2) Date: Nov. 21, 2022

(87) PCT Pub. No.: WO2021/238978
PCT Pub. Date: Dec. 2, 2021

(65) Prior Publication Data
US 2023/0190732 A1   Jun. 22, 2023

(30) Foreign Application Priority Data

May 29, 2020 (CN) .......................... 202010475953.9

(51) Int. Cl.
| | | |
|---|---|---|
| *A61K 31/4709* | (2006.01) | |
| *A61K 9/14* | (2006.01) | |
| *A61K 9/16* | (2006.01) | |
| *A61K 9/20* | (2006.01) | |
| *A61K 9/28* | (2006.01) | |
| *A61K 9/48* | (2006.01) | |
| *A61K 47/02* | (2006.01) | |
| *A61K 47/26* | (2006.01) | |
| *A61K 47/36* | (2006.01) | |
| *A61P 13/02* | (2006.01) | |
| *A61P 31/00* | (2006.01) | |
| *A61P 35/00* | (2006.01) | |

(52) U.S. Cl.
CPC ............ *A61K 31/4709* (2013.01); *A61K 9/16* (2013.01); *A61K 47/02* (2013.01); *A61K 47/26* (2013.01); *A61K 47/36* (2013.01)

(58) Field of Classification Search
None
See application file for complete search history.

(56) References Cited

U.S. PATENT DOCUMENTS

| | | | |
|---|---|---|---|
| 2018/0028451 A1* | 2/2018 | Behrend | ................. A61K 9/145 |
| 2021/0363165 A1* | 11/2021 | Deng | .................... C07D 401/14 |

FOREIGN PATENT DOCUMENTS

| | | | | |
|---|---|---|---|---|
| CN | 111514142 A | 8/2020 | | |
| WO | 2020063824 A | 4/2020 | | |
| WO | WO-2020063824 A1 * | 4/2020 | ............. | C07D 13/12 |

OTHER PUBLICATIONS

International Search Report issued Aug. 9, 2021 in PCT/CN2021/096037.

* cited by examiner

*Primary Examiner* — Brian Gulledge
(74) *Attorney, Agent, or Firm* — Ice Miller LLP (57) ABSTRACT

A pharmaceutical composition containing a nitroxoline prodrug, and a preparation method and an application therefor. The pharmaceutical composition comprises the following ingredients in parts by weight: 100 parts of active pharmaceutical ingredient, 22.5-320 parts of filler, 0-40 parts of disintegrant, 0-95 parts of binding agent, and 2-30 parts of lubricant; relative to each 100 parts by weight of active pharmaceutical ingredient, the total content of the filler, the disintegrant, and the binding agent is 54-345 parts by weight; the active pharmaceutical ingredient is (S)-(5-nitroxoline-8-yloxy)methyl 1-isopropylpyrrolidine-2-carboxylate. The pharmaceutical composition has good stability, dissolution properties, and pharmacokinetic characteristics.

13 Claims, 1 Drawing Sheet

PHARMACEUTICAL COMPOSITION CONTAINING NITROXOLINE PRODRUG, AND PREPARATION METHOD AND APPLICATION THEREFOR

CROSS-REFERENCE TO RELATED APPLICATION

This application is a Section 371 of International Application No. PCT/CN2021/096037 filed May 26, 2021, which was published in the Chinese language Dec. 2, 2021, under International Publication No. WO 2021/238978 A1, which claims priority to Chinese Patent Application No. 202010475953.9 filed May 29, 2020, the disclosures of which are incorporated herein by reference in their entireties.

FIELD OF THE INVENTION

The present invention relates to a pharmaceutical composition comprising nitroxoline prodrug, a method for preparing the same, and a use thereof.

BACKGROUND OF THE INVENTION

Nitroxoline, the chemical name of which is 5-nitro-8-hydroxyquinoline, was developed as an oral antibiotic drug in the 1960s. It was mainly used for urinary system infections and had a relatively safe history of use before being replaced due to discovery and use of new antibiotics. In recent years, new studies have found that nitroxoline can simultaneously inhibit the methionine aminopeptidase MetAP2 and the silence information regulator 2-related enzyme SIRT1 in vascular endothelial cells, exerting a synergistic inhibitory effect on tumor angiogenesis, as well as an inhibitory effect on the proliferation of tumor cells. Therefore, nitroxoline has been re-developed to treat tumors including bladder cancer.

A prodrug is a compound obtained by chemical modification of an active drug, which is converted into the original drug in vivo by the action of enzymes to exert its efficacy. Prodrugs are widely used in drug research and development. A prodrug is a method for modifying a drug, which can overcome various undesirable characteristics and properties, and can mainly bring the following advantages: increasing drug solubility, improving drug absorption and distribution, increasing drug stability, reducing toxicity or adverse reactions, prolonging drug action time, eliminating drug unsuitable properties and the like.

In order to prolong the half-life of nitroxoline, patent application publication No. WO/2020/063824 discloses a lot of research work as well as a nitroxoline prodrug (S)-(5-nitroquinolin-8-yloxy)methyl 1-isopropionylpyrrolidine-2-carboxylate. The prodrug is metabolized into nitroxoline to play its role after entering the body, and can prolong the half-life of nitroxoline in vivo, so as to achieve the purpose of reducing the frequency of administration.

However, there is no formulation for the above nitroxoline prodrug in the prior art.

SUMMARY OF THE INVENTION

The present inventor has developed new formulations for the above nitroxoline prodrug (S)-(5-nitroquinolin-8-yloxy)methyl 1-isopropionylpyrrolidine-2-carboxylate through intensive research. Such formulations have good stability, dissolution properties and pharmacokinetic characteristics, and can be advantageously used for the preparation of drugs, showing good clinical application prospects.

Therefore, an object of the present invention is to provide a nitroxoline prodrug-containing pharmaceutical composition comprising the following components in parts by weight: 100 parts by weight of the active pharmaceutical ingredient, 22.5 to 320 parts by weight of filler, 0 to 40 parts by weight of disintegrant, 0 to 95 parts by weight of binder, and 2 to 30 parts by weight of lubricant; the filler, the disintegrant and the binder are present in a total amount of 54 to 345 parts by weight per 100 parts by weight of the active pharmaceutical ingredient; and the active pharmaceutical ingredient is (S)-(5-nitroquinolin-8-yloxy)methyl 1-isopropionylpyrrolidine-2-carboxylate.

In the above pharmaceutical composition, the structural formula of the active pharmaceutical ingredient (S)-(5-nitroquinolin-8-yloxy)methyl 1-isopropionylpyrrolidine-2-carboxylate is as follows:

The active pharmaceutical ingredient can be obtained by the preparation method of Example 20 of the patent application publication No. WO/2020/063824.

In the above pharmaceutical composition, the filler can be one or more of starch, pregelatinized starch, partially pregelatinized starch, lactose, sucrose, mannitol, sorbitol, hydrous calcium phosphate, anhydrous calcium phosphate and microcrystalline cellulose, preferably one or more of pregelatinized starch, lactose, sucrose, mannitol and microcrystalline cellulose, and more preferably a mixture of pregelatinized starch, mannitol and microcrystalline cellulose. When the filler is a mixture of pregelatinized starch, mannitol and microcrystalline cellulose, the weight ratio of the three is preferably 0.5-2:1:0.5-2, more preferably 0.8-1.3:1:0.8-1.3, and further more preferably 1.06-1.07:1:1.09-1.25.

In the above pharmaceutical composition, the filler is preferably present in an amount of 50 to 320 parts by weight, more preferably 60 to 300 parts by weight, such as 100 or 200 parts by weight, further more preferably 90 to 200 parts by weight, and most preferably 90.8-93 parts by weight per 100 parts by weight of the active pharmaceutical ingredient.

In the above pharmaceutical composition, the disintegrant can be one or more of low-substituted hydroxypropyl methylcellulose, calcium carboxymethylcellulose, sodium carboxymethyl starch, croscarmellose sodium and crospovidone, preferably one or two of croscarmellose sodium and crospovidone, and more preferably crospovidone.

In the above pharmaceutical composition, the disintegrant is preferably present in an amount of 15 to 35 parts by weight, such as 31.5 parts by weight, and more preferably 15 to 17 parts by weight per 100 parts by weight of the active pharmaceutical ingredient.

In the above pharmaceutical composition, the binder can be one or more of hydroxypropyl cellulose, hydroxypropyl methyl cellulose, povidone and starch, and preferably one or more of hydroxypropyl methylcellulose, povidone and starch.

In the above pharmaceutical composition, the binder is preferably present in an amount of 10 to 50 parts by weight per 100 parts by weight of the active pharmaceutical ingredient.

In the above pharmaceutical composition, the filler, disintegrant and binder are preferably present in a total amount of 100 to 320 parts by weight, such as 195 or 290 parts by weight, more preferably 100 to 120 parts by weight, such as 108 parts by weight per 100 parts by weight of the active pharmaceutical ingredient.

In the above pharmaceutical composition, the lubricant can be one or more of stearic acid, magnesium stearate, calcium stearate, high molecular weight polyethylene glycol, sodium stearyl fumarate and sodium lauryl sulfonate, preferably one or two of sodium stearyl fumarate and sodium lauryl sulfonate, and more preferably sodium stearyl fumarate.

In the above pharmaceutical composition, the lubricant is preferably present in an amount of 2 to 10 parts by weight, such as 3.2 or 5 parts by weight, more preferably 2 to 8 parts by weight, and further more preferably 2 to 2.1 parts by weight per 100 parts by weight of the active pharmaceutical ingredient.

In the above pharmaceutical composition, the pharmaceutical composition can also comprise a coating agent. The coating agent can be a coating agent commonly used in the art, such as a coating agent whose trade name is Opadry. The coating agent can be used in the conventional amount in the art. For example, the ratio of the mass of the coating agent to the mass of the uncoated pharmaceutical composition is 1.5% to 6%, and preferably 2% to 4%.

In the above pharmaceutical composition, the pharmaceutical composition can also comprise one or more of colorant, pH adjuster, surfactant, stabilizer and fragrance.

In the above pharmaceutical composition, the pharmaceutical composition can be a conventional dosage form in the art, such as a solid formulation, for example a granule, powder, capsule or tablet, preferably tablet, and further preferably immediate-release tablet.

In a preferred embodiment of the present invention, the pharmaceutical composition is a tablet, the tablet comprises the following components in parts by weight: 100 parts by weight of the active pharmaceutical ingredient, 22.5 to 320 parts by weight of filler, 0 to 40 parts by weight of disintegrant, 0 to 95 parts by weight of binder, and 2 to 30 parts by weight of lubricant; the filler, the disintegrant and the binder are present in a total amount of 54 to 345 parts by weight per 100 parts by weight of the active pharmaceutical ingredient; and the active pharmaceutical ingredient is (S)-(5-nitroquinolin-8-yloxy)methyl 1-isopropionylpyrrolidine-2-carboxylate;

the filler is one or more of pregelatinized starch, lactose, sucrose, mannitol and microcrystalline cellulose; the disintegrant is one or two of croscarmellose sodium and crospovidone; the binder is one or more of hydroxypropyl methylcellulose, povidone and starch; and the lubricant is one or two of sodium stearyl fumarate and sodium lauryl sulfonate. The tablet is preferably a coated tablet, and the ratio of the mass of the coating agent in the coated tablet to the mass of the uncoated plain tablet is 1.5% to 6%, and preferably 2% to 4% (for example, 3%).

In a further preferred embodiment of the present invention, the pharmaceutical composition is a tablet, the tablet comprises the following components in parts by weight: 100 parts by weight of the active pharmaceutical ingredient, 22.5 to 320 parts by weight of filler, 15 to 17 parts by weight of disintegrant, and 2 to 10 parts by weight of lubricant; the filler and the disintegrant are present in a total amount of 100 to 120 parts by weight (for example, 108 parts by weight) per 100 parts by weight of the active pharmaceutical ingredient; and the active pharmaceutical ingredient is (S)-(5-nitroquinolin-8-yloxy)methyl 1-isopropionylpyrrolidine-2-carboxylate;

the filler is a mixture of pregelatinized starch, mannitol and microcrystalline cellulose, and the weight ratio of the three is 0.5-2:1:0.5-2; the disintegrant is crospovidone; and the lubricant is sodium stearyl fumarate.

In the above further preferred embodiment, the filler is preferably present in an amount of 60 to 300 parts by weight, more preferably 90 to 200 parts by weight, and most preferably 90.8-93 parts by weight.

In the above further preferred embodiment, the weight ratio of pregelatinized starch, mannitol and microcrystalline cellulose in the filler is preferably 0.8-1.3:1:0.8-1.3, and more preferably 1.06-1.07:1:1.09-1.25.

In the above further preferred embodiment, the lubricant is preferably present in an amount of 2 to 8 parts by weight, and more preferably 2 to 2.1 parts by weight.

In the above further preferred embodiment, preferably, the filler is present in an amount of 90.8-93 parts by weight; the weight ratio of pregelatinized starch, mannitol and microcrystalline cellulose in the filler is 1.06-1.07:1:1.09-1.25; and the lubricant is present in an amount of 2 to 2.1 parts by weight.

In the above further preferred embodiment, the tablet does not comprise binder.

In the above further preferred embodiment, the tablet is preferably a coated tablet, and the ratio of the mass of the coating agent in the coated tablet to the mass of the uncoated plain tablet is 1.5 to 6%, and preferably 2% to 4% (for example, 3%).

Another object of the present invention is to provide a preparation method for the aforementioned granule, powder, capsule or tablet, the preparation method can be a conventional preparation method in the art.

When the final formulation is a granule, conventional dry granulation in the art can be used, and in this case, the preparation method comprises the following steps of:
S1: mixing the other components except the lubricant to obtain mixture I;
S2: mixing the mixture I with the lubricant to obtain the formulation.

When the final formulation is a granule, conventional wet granulation in the art can also be used,
when the formulation comprises a binder, the preparation method comprises the following steps of:
S1: mixing the other components except the lubricant and the binder with a solution comprising the binder, and subjecting the resulting mixture to wet drying and dry milling to obtain dry granules;
S2: mixing the dry granules with the lubricant to obtain the formulation; or,
when the formulation does not comprise a binder, the preparation method comprises the following steps of:

S1: mixing the other components except the lubricant with water, and subjecting the resulting mixture to wet milling, drying and dry milling to obtain dry granules;

S2: mixing the dry granules with the lubricant to obtain the formulation.

When the final formulation is a powder, the preparation method comprises the following step of directly mixing the components to obtain the formulation.

When the final formulation is a capsule, the preparation method comprises the following steps of: after conducting the aforementioned preparation method for the granule, further filling the resulting granules into capsules to obtain the formulation.

When the final formulation is a tablet, the preparation method comprises the following steps of: after conducting the aforementioned preparation method for the granule, further compressing the resulting granules into tablets to obtain the formulation.

Another object of the present invention is to provide a use of the aforementioned pharmaceutical composition or the aforementioned tablet in the preparation of a medicament for treating infectious disease or cancer. The infectious disease can be, for example, urinary tract infection. The cancer can be, for example, bladder cancer.

On the basis of not violating common knowledge in the art, the aforementioned preferred features can be combined arbitrarily to obtain preferred embodiments of the present invention.

The reagents and raw materials used in the present invention are all commercially available.

The positive progressive effects of the present invention are that: the pharmaceutical composition of the present invention has good stability, dissolution properties and pharmacokinetic properties, and can be advantageously used for clinical development and application.

DETAILED DESCRIPTION OF THE INVENTION

The present invention will be described in detail below with reference to the Examples. The Examples of the present invention are only used to illustrate the technical solutions of the present invention, without limiting the essence and scope of the present invention. Various changes and modifications can be made by those skilled in the art within the scope of the present invention.

Experimental Reagents:

The nitroxoline prodrug is (S)-(5-nitroquinolin-8-yloxy)methyl 1-isopropionylpyrrolidine-2-carboxylate, prepared according to the method of Example 20 of the patent application publication No. WO/2020/063824.

Starch: Liaoning Dongyuan Pharmaceutical Co., Ltd. or Roquette, France

Pregelatinized starch: Shanghai Colorcon

Microcrystalline cellulose: JRS PHARMA

Hydroxypropyl methylcellulose: Dow, USA or Shin-Etsu, Japan

Lactose: MEGGLE, Germany

Sodium stearyl fumarate: JRS PHARMA

Sodium dodecyl sulfonate: BASF, Germany

Crospovidone: JRS PHARMA, or ISP, USA, or BASF, Germany

Mannitol: Roquette, France

Purified water: Taizhou Shengjieda

Croscarmellose sodium: DuPont, USA

Povidone: BASF, Germany

Coating powder (trade name: Opadry): Shanghai Colorcon

Experimental Instruments:

Electronic balance: Shanghai Sunny Hengping Instrument, FA1004

Dissolution apparatus: Tianjin Tianda Tianfa Technology, RC8MD

Dissolution apparatus automatic sampler: Tianda Tianfa Technology, RCQ-8C

Tableting machine: Shanghai Tianfan Machinery Factory, TDP-6

Tableting machine: Shanghai Tianxiang & Chentai, ZPS008

Dry granulator: Nanjing Honggangsheng, GK-25

Coating machine: Taizhou Jintai Pharmaceutical Machinery Factory, BY-300

Coating machine: Zhejiang Xiaolun Pharmaceutical Machinery, BGB-5F

UV spectrophotometer: Shimadzu, Japan, UV-2700

Liquid chromatograph: Shimadzu, Japan, LC-20AT

Dog food: Beijing Keao Xieli Feed Co., Ltd.

Hereinafter, coating weight gain refers to the percentage of coating weight in the weight of the plain tablet.

The components and amounts of each Example and Comparative Example are as follows:

| Function | Component | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|
| | | Parts by weight | | | | | | | | | | | |
| API | Nitroxoline prodrug | 100 | 100 | 100 | 100 | 100 | 100 | 100 | 100 | 100 | 100 | 100 | 100 |
| Filler | Pregelatinized starch | / | 100 | 30.5 | 100 | 110 | 100 | 30 | 30 | 100 | 80 | / | 80 |
| | Lactose | / | 100 | / | / | 100 | / | / | / | / | 80 | / | 80 |
| | Mannitol | / | / | 28.8 | / | / | / | 28 | 28 | 100 | 80 | / | 80 |
| | Microcrystalline cellulose | 22.5 | 100 | 31.5 | 100 | 110 | / | 35 | 35 | 100 | 40 | 20 | / |
| Disintegrant | Croscarmellose sodium | / | / | / | 40 | / | / | / | 15 | / | 120 | 20 | 120 |
| | Crospovidone | 31.5 | 35 | 17 | / | / | / | 15 | / | / | / | / | / |
| Binder | Hydroxypropyl methylcellulose | / | 10 | / | / | / | / | / | / | / | / | / | / |

-continued

| Function | Component | 1 | 2 | 3 | 4 | 5 | 6 | 7 | 8 | Comparative Example 1 | Comparative Example 2 | Comparative Example 3 | Comparative Example 4 |
|---|---|---|---|---|---|---|---|---|---|---|---|---|---|
| | | | | | | Example | | | Parts by weight | | | | |
| | Povidone | / | / | / | 50 | / | / | / | / | 100 | / | / | / |
| | Starch | / | / | / | / | / | 95 | / | / | / | / | / | / |
| Lubricant | Sodium stearyl fumarate | / | / | 2.1 | 10 | / | 5 | 2 | 2 | 8 | 5 | 5 | / |
| | Sodium dodecyl sulfonate | 3.2 | 5 | / | / | 30 | / | / | / | / | / | / | / |
| Coating agent | Coating powder (trade name: Opadry) | 4.7 | 13.5 | 6.3 | 12 | 14 | 9 | 6.3 | 6.3 | 15.2 | 15.2 | 4.35 | 13.8 |
| | Coating weight gain/% | 3 | 3 | 3 | 3 | 3 | 3 | 3 | 3 | 3 | 3 | 3 | 3 |
| | Total parts by weight of the filler | 22.5 | 300 | 90.8 | 200 | 320 | 100 | 93 | 93 | 300 | 280 | 20 | 240 |
| | Total parts by weight of the disintegrant | 31.5 | 35 | 17 | 40 | 0 | 0 | 15 | 15 | 0 | 120 | 20 | 120 |
| | Total parts by weight of the binder | 0 | 10 | 0 | 50 | 0 | 95 | 0 | 0 | 100 | 0 | 0 | 0 |
| | Total parts by weight of the lubricant | 3.2 | 5 | 2.1 | 10 | 30 | 5 | 2 | 2 | 8 | 5 | 5 | 0 |
| | Total parts by weight of the filler, disintegrant and binder | 54 | 345 | 108 | 290 | 320 | 195 | 108 | 108 | 400 | 400 | 40 | 360 |

EXAMPLE 1

500 tablets were prepared, and the weight of each tablet was about 160 mg.

Method for Preparing the Immediate-Release Tablets:
(1) the API, filler, disintegrant and lubricant of each formulation were weighed respectively according to the above table;
(2) the API and other components were filtered through a 60-mesh sieve for later use;
(3) the other components in step (2) except the lubricant were mixed, and subjected to wet granulation by the addition of 20 to 30 mL of purified water to obtain soft material; the resulting soft material was subjected to wet milling through an 18-mesh sieve, and dried at 60° C. to a moisture content of 1.5 to 3.5 wt %; the resulting material was subjected to dry milling through an 18-mesh sieve, followed by the addition of the lubricant, and mixed for 10 minutes;
(4) the resulting material was compressed into plain tablets using TDP-6;
(5) the plain tablets were film-coated (the coating weight gain was 3%, and the coating liquid concentration was 15 wt %) using BY-300 to obtain the immediate-release tablets of this Example.

EXAMPLE 2

500 tablets were prepared, and the weight of each tablet was about 450 mg.

Method for Preparing the Immediate-Release Tablets:
(1) the API, filler, binder, disintegrant and lubricant of each formulation were weighed respectively according to the above table;
(2) preparation of the binder (10 wt % hydroxypropyl methylcellulose solution): about 90 mL of purified water was taken, and hydroxypropyl methylcellulose was slowly added under stirring; the resulting mixture was left to stand until the solid was completely dissolved for later use;
(3) the API and other components were filtered through a 60-mesh sieve for later use;
(4) the other components in step (3) except the lubricant were mixed, and subjected to wet granulation by the addition of the binder obtained in step (2) to obtain soft material; the resulting soft material was subjected to wet milling through an 18-mesh sieve, and dried at 60° C. to a moisture content of 1.5 to 3.5 wt %; the resulting material was subjected to dry milling through an 18-mesh sieve, followed by the addition of the lubricant, and mixed for 10 minutes;
(5) the resulting material was compressed into plain tablets using ZPS008;
(6) the plain tablets were film-coated (the coating weight gain was 3%, and the coating liquid concentration was 15 wt %) using BGB-5F to obtain the immediate-release tablets of this Example.

EXAMPLE 3

120 tablets were prepared, and the weight of each tablet was about 800 mg.

Method for Preparing the Immediate-Release Tablets:
(1) the API, filler, disintegrant and lubricant of each formulation were weighed respectively according to the above table;
(2) the API and other components were filtered through a 60-mesh sieve for later use;
(3) the other components in step (2) except the lubricant were mixed, and subjected to wet granulation by the addition of 25 to 30 mL, of purified water to obtain soft material; the resulting soft material was subjected to wet milling through an 18-mesh sieve, and dried at 60° C. to a moisture content of 1.5 to 3.5 wt %; the resulting material was subjected to dry milling through an 18-mesh sieve, followed by the addition of the lubricant, and mixed for 10 minutes;
(4) the resulting material was compressed into plain tablets using TDP-6;
(5) the plain tablets were film-coated (the coating weight gain was 3%, and the coating liquid concentration was 15 wt %) using BY-300 to obtain the immediate-release tablets of this Example.

In addition, according to the same components, amount and preparation method as described above, immediate-release tablets with a coating weight gain of 2% and 4% were prepared respectively, which were respectively defined as Example 3-1 and Example 3-2.

EXAMPLE 4

500 tablets were prepared, and the weight of each tablet was about 400 mg.

Method for Preparing the Immediate-Release Tablets:
(1) the API, filler, binder, disintegrant and lubricant of each formulation were weighed respectively according to the above table;
(2) the API and other components were filtered through a 60-mesh sieve for later use;
(3) the other components in step (2) except the lubricant were mixed, and subjected to wet granulation by the addition of 55 to 65 mL of purified water to obtain soft material; the resulting soft material was subjected to wet milling through an 18-mesh sieve, and dried at 60° C. to a moisture content of 1.5 to 3.5 wt %; the resulting material was subjected to dry milling through an 18-mesh sieve, followed by the addition of the lubricant, and mixed for 10 minutes;
(4) the resulting material was compressed into plain tablets using TDP-6;
(5) the plain tablets were film-coated (the coating weight gain was 3%, and the coating liquid concentration was 15 wt %) using BY-300 to obtain the immediate-release tablets of this Example.

In addition, according to the same components, amount and preparation method as described above, immediate-release tablets with a coating weight gain of 2% and 4% were prepared respectively, which were respectively defined as Example 4-1 and example 4-2.

EXAMPLE 5

500 tablets were prepared, and the weight of each tablet was about 450 mg.

Method for Preparing the Immediate-Release Tablets:
(1) the API, filler and lubricant of each formulation were weighed respectively according to the above table;
(2) the API and other components were filtered through a 60-mesh sieve for later use;
(3) the API and filler were mixed for 10 minutes, subjected to dry granulation through an 18-mesh sieve, followed by the addition of the lubricant, and mixed for 10 minutes;
(4) the resulting material was compressed into plain tablets using TDP-6;
(5) the plain tablets were film-coated (the coating weight gain was 3%, and the coating liquid concentration was 15 wt %) using BY-300 to obtain the immediate-release tablets of this Example.

EXAMPLE 6

500 tablets were prepared, and the weight of each tablet was about 300 mg.

Method for Preparing the Immediate-Release Tablets:
(1) the API, filler, binder and lubricant of each formulation were weighed respectively according to the above table;
(2) the API and other components were filtered through a 60-mesh sieve for later use;
(3) the API, filler and binder were mixed for 10 minutes, followed by the addition of the lubricant, and mixed for 10 minutes;
(4) the resulting material was compressed into plain tablets using TDP-6;
(5) the plain tablets were film-coated (the coating weight gain was 3%, and the coating liquid concentration was 15 wt %) using BY-300 to obtain the immediate-release tablets of this Example.

In addition, according to the same components, amount and preparation method as described above, immediate-release tablets with a coating weight gain of 2% and 4% were prepared respectively, which were respectively defined as Example 6-1 and Example 6-2.

EXAMPLE 7

500 tablets were prepared, and the weight of each tablet was about 210 mg.

Method for Preparing the Immediate-Release Tablets:
(1) the API, filler, disintegrant and lubricant of each formulation were weighed respectively according to the above table;
(2) the API and other components were filtered through a 60-mesh sieve for later use;
(3) the other components in step (2) except the lubricant were mixed, and subjected to wet granulation by the addition of 25 to 35 mL of purified water to obtain soft material; the resulting soft material was subjected to wet milling through an 18-mesh sieve, and dried at 60° C. to a moisture content of 1.5 to 3.5 wt %; the resulting material was subjected to dry milling through an 18-mesh sieve, followed by the addition of the lubricant, and mixed for 10 minutes;
(4) the resulting material was compressed into plain tablets using TDP-6;
(5) the plain tablets were film-coated (the coating weight gain was 3%, and the coating liquid concentration was 15 wt %) using BY-300 to obtain the immediate-release tablets of this Example.

In addition, according to the same components, amount and preparation method as described above, immediate-release tablets with a coating weight gain of 2% and 4% were prepared respectively, which were respectively defined as Example 7-1 and Example 7-2.

EXAMPLE 8

500 tablets were prepared, and the weight of each tablet was about 210 mg.

Method for Preparing the Immediate-Release Tablets:
(1) the API, filler, disintegrant and lubricant of each formulation were weighed respectively according to the above table;
(2) the API and other components were filtered through a 60-mesh sieve for later use;
(3) the other components in step (2) except the lubricant were mixed, and subjected to wet granulation by the addition of 25 to 35 mL of purified water to obtain soft material; the resulting soft material was subjected to wet milling through an 18-mesh sieve, and dried at 60° C. to a moisture content of 1.5 to 3.5 wt %; the resulting material was subjected to dry milling through an 18-mesh sieve, followed by the addition of the lubricant, and mixed for 10 minutes;
(4) the resulting material was compressed into plain tablets using TDP-6;

(5) the plain tablets were film-coated (the coating weight gain was 3%, and the coating liquid concentration was 15 wt %) using BY-300 to obtain the immediate-release tablets of this Example.

In addition, according to the same components, amount and preparation method as described above, immediate-release tablets with a coating weight gain of 2% and 4% were prepared respectively, which were respectively defined as Example 8-1 and Example 8-2.

Comparative Example 1

500 tablets were prepared, and the weight of each tablet was about 408 mg.
Method for Preparing the Tablets:
(1) the API, filler, binder and lubricant of each formulation were weighed respectively according to the above table;
(2) the API and other components were filtered through a 60-mesh sieve for later use;
(3) the other components in step (2) except the lubricant were mixed, and subjected to wet granulation by the addition of 55 to 65 mL of purified water to obtain soft material; the resulting soft material was subjected to wet milling through an 18-mesh sieve, and dried at 60° C. to a moisture content of 1.5 to 3.5 wt %; the resulting material was subjected to dry milling through an 18-mesh sieve, followed by the addition of the lubricant, and mixed for 10 minutes;
(4) the resulting material was compressed into plain tablets using TDP-6;
(5) the plain tablets were film-coated (the coating weight gain was 3%, and the coating liquid concentration was 15 wt %) using BY-300 to obtain the tablets.

Comparative Example 2

500 tablets were prepared, and the weight of each tablet was about 465 mg.
Method for Preparing the Tablets:
(1) the API, filler, disintegrant and lubricant of each formulation were weighed respectively according to the above table;
(2) the API and other components were filtered through a 60-mesh sieve for later use;
(3) the other components in step (2) except the lubricant were mixed, and subjected to wet granulation by the addition of 65 to 75 mL of purified water to obtain soft material; the resulting soft material was subjected to wet milling through an 18-mesh sieve, and dried at 60° C. to a moisture content of 1.5 to 3.5 wt %; the resulting material was subjected to dry milling through an 18-mesh sieve, followed by the addition of the lubricant, and mixed for 10 minutes;
(4) the resulting material was compressed into plain tablets using TDP-6;
(5) the plain tablets were film-coated (the coating weight gain was 3%, and the coating liquid concentration was 15 wt %) using BY-300; during the coating process, it was found that the surface of the tablet bulged and peeled off, and it was considered that there was too much disintegrant, which absorbed water, and the tablet expanded leading to the tablet surface unqualified.

Comparative Example 3

500 tablets were prepared, and the weight of each tablet was about 225 mg.
Method for Preparing the Tablets:
(1) the API, filler, disintegrant and lubricant of each formulation were weighed respectively according to the above table;
(2) the API and other components were filtered through a 60-mesh sieve for later use;
(3) the other components in step (2) except the lubricant were mixed, and subjected to wet granulation by the addition of 28 to 38 mL of purified water to obtain soft material; the resulting soft material was subjected to wet milling through an 18-mesh sieve, and dried at 60° C. to a moisture content of 1.5 to 3.5 wt %; the resulting material was subjected to dry milling through an 18-mesh sieve, followed by the addition of the lubricant, and mixed for 10 minutes;
(4) the resulting material was compressed into plain tablets using TDP-6; the friability of the plain tablet was unqualified, and the weight loss was >1%; the further coating step was not conducted.

Comparative Example 4

500 tablets were prepared, and the weight of each tablet was about 460 mg.
Method for Preparing the Tablets:
(1) the API, filler and disintegrant of each formulation were weighed respectively according to the above table;
(2) the API and other components were filtered through a 60-mesh sieve for later use;
(3) the components in step (2) were mixed, and subjected to wet granulation by the addition of 65 to 75 mL of purified water to obtain soft material; the resulting soft material was subjected to wet milling through an 18-mesh sieve, and dried at 60° C. to a moisture content of 1.5 to 3.5 wt %; the resulting material was subjected to dry milling through an 18-mesh sieve and mixed for 10 minutes;
(4) the resulting material was compressed into plain tablets using TDP-6; sticky tablets appeared during the tableting process, which was caused by the lack of lubricant in the formulation.

Test Example 1 Penetration Test

Nitroxoline has strong mobility and permeability, and it easily dyes other materials in contact yellow because it is yellow or yellowish. The nitroxoline prodrug ((S)-(5-nitro-quinolin-8-yloxy)methyl 1-isopropionylpyrrolidine-2-carboxylate) is also yellow or yellowish.

The immediate-release tablets with different weight gains obtained in Examples 3, 4, 6, 7 and 8 were respectively placed in white plastic bottles which were then placed in an oven at 60° C. for 10 days for investigation. It was observed whether the nitroxoline prodrug would penetrate the coating film and dye the white plastic bottle yellow. The penetrability results are as shown in Table 1 below

TABLE 1

Results of the color penetration test of the immediate-release tablets with different coating weight gains of the present invention

| Example | API amount % | Coating weight gain | Color penetration |
|---|---|---|---|
| Example 3 | 47.64 | 3% | No |
| Example 3-1 | 47.64 | 2% | No |

TABLE 1-continued

Results of the color penetration test of the immediate-release tablets with different coating weight gains of the present invention

| Example | API amount % | Coating weight gain | Color penetration |
|---|---|---|---|
| Example 3-2 | 47.64 | 4% | No |
| Example 4 | 25.00 | 3% | No |
| Example 4-1 | 25.00 | 2% | No |
| Example 4-2 | 25.00 | 4% | No |
| Example 6 | 33.33 | 3% | No |
| Example 6-1 | 33.33 | 2% | No |
| Example 6-2 | 33.33 | 4% | No |
| Example 7 | 47.62 | 3% | No |
| Example 7-1 | 47.62 | 2% | No |
| Example 7-2 | 47.62 | 4% | No |
| Example 8 | 47.62 | 3% | No |
| Example 8-1 | 47.62 | 2% | No |
| Example 8-2 | 47.62 | 4% | No |

It can be seen from Table 1 that there is no color penetration after placing the tablets having a coating weight gain of 2% to 4% at a high temperature of 60° C. for 10 days. It can be seen that the coating weight gain of 2% to 4% can meet the needs.

Nitroxoline is yellow or yellowish, and has strong mobility and permeability. The dyeability of the nitroxoline prodrug-containing formulation of the present invention is greatly reduced, the cleaning difficulty and the production cost are also reduced, providing convenience for the industrial production. Meanwhile, there is no need to use complex and expensive coating processes, such as sugar coating, thick film coating or other barrier coatings, only conventional film coating is needed. The process is simple and the cost of industrial production is low, thereby reducing medical costs for patients and the country.

Test Example 2 Stability Test

The impurity content of the immediate-release tablets obtained in Examples 1, 3, and 8 was determined respectively to evaluate the stability, and the steps were as follows:

1. Preparation Method for Test Solution I and Test Solution II

About 25 mg of a batch of nitroxoline prodrug was added to a 50 mL volumetric flask, followed by the addition of about 30 mL of acetonitrile. The resulting solution was ultrasonicated for 10 minutes, cooled to room temperature, diluted with acetonitrile to the constant volume, and mixed well. An appropriate amount of the above solution was filtered to obtain test solution I.

According to the above method, another batch of nitroxoline prodrug was used to obtain test solution II.

Test solution I was used to study the impurity content under normal temperature and different storage times (0 h, 6 h, 12 h, 18 h, 24 h), and the impurity content under 2 to 8° C. and a storage time of 24 hours.

Test solution II was used to study the impurity content under two different stability conditions (intermediate condition of 30° C./65% RH and accelerated condition of 40° C./75% RH, as shown in Table 2).

2. Preparation Method for Test Solution III 5 random immediate-release tablets of the corresponding Examples at 0 day and 6 months (accelerated condition of 40° C./75% RH) were respectively added to a 200 mL volumetric flask, followed by the addition of methanol to dissolve by ultrasonic (about 45 minutes). The resulting solution was cooled to room temperature, diluted with methanol to the constant volume, mixed well and filtered. 1 mL of the filtrate was precisely transferred to a 20 mL volumetric flask, diluted with acetonitrile to the constant volume, and mixed well to obtain test solution III.

3. Preparation Method for 0.2% Self-Control Solution 2 mL of test solution I, test solution II or test solution III was added to a 100 mL volumetric flask, and diluted with acetonitrile to the constant volume. 1 mL of the resulting solution was added to a 10 mL volumetric flask, diluted with acetonitrile to the constant volume, and mixed well to obtain the desired solution.

4. Determination of Impurity Content

Test solution I was placed at room temperature, and samples were collected respectively at 0 h, 6 h, 12 h, 18 h, 24 h. 0.2% self-control solution was formulated. Samples were injected respectively, and the single impurity content and total impurity content in test solution I at each time point were calculated according to the self-control.

Test solution I was placed in a refrigerator (2 to 8° C.), and samples were collected at 24 h. 0.2% self-control solution was formulated. Samples were injected respectively, and the single impurity content and total impurity content in test solution I at this time point were calculated according to the self-control.

Samples were collected from Test solution II at 0 day, at one month under the intermediate condition (30° C./65% RH) and at one month under the accelerated condition (40° C./75% RH). 0.2% self-control solution was formulated. Samples were injected respectively, and the single impurity content and total impurity content in test solution II at this time point were calculated according to the self-control.

Samples were collected from Test solution III at 0 day under the accelerated condition and at six months under the accelerated condition. 0.2% self-control solution was formulated. Samples were injected respectively, and the single impurity content and total impurity content in test solution III at each time point were calculated according to the self-control.

The chromatographic conditions are as follows:

| | |
|---|---|
| Column | Waters XBridge $C_{18}$ 4.6 × 150 mm, 5 μm |
| Detection wavelength | 210 nm |
| Column temperature | 35° C. |
| Flow rate | 1.0 mL/min |
| Injection volume | 10 μL |
| Mobile phase A | 0.1 v % phosphoric acid solution |
| Mobile phase B | Acetonitrile |

| | Time (min) | A % | B % |
|---|---|---|---|
| Gradient procedure | 0.0 | 90 | 10 |
| | 10.0 | 55 | 45 |
| | 15.0 | 40 | 60 |
| | 20.0 | 5 | 95 |
| | 21.0 | 90 | 10 |
| | 30.0 | 90 | 10 |

The results of impurity content are shown in Table 2 below.

TABLE 2

Impurity content of nitroxoline prodrug solution and immediate-release tablets of the present invention

| Test solution | Storage time | \multicolumn{9}{c|}{Impurity (%)/RRT relative retention time} | Total impurity (%) |
|---|---|---|---|---|---|---|---|---|---|---|---|
| | | 0.71 | 0.78 | 0.83 | 0.89 | 0.9 | 0.93 | 1.06 | 1.95 | 1.97 | |
| Test solution I | 0 h(RT) | —* | — | — | 0.055 | 0.055 | 0.082 | — | — | — | 0.192 |
| | 6 h(RT) | 0.18 | — | — | 0.059 | 0.069 | 0.091 | — | 0.089 | 0.251 | 0.739 |
| | 12 h(RT) | 0.176 | — | — | 0.053 | 0.063 | 0.092 | — | 0.093 | 0.256 | 0.733 |
| | 18 h(RT) | 0.174 | — | 0.377 | 0.054 | 0.057 | 0.092 | — | 0.065 | 0.216 | 1.035 |
| | 24 h(RT) | 0.177 | — | 0.524 | 0.054 | 0.053 | 0.09 | — | 0.097 | 0.259 | 1.254 |
| | 24 h(2-8° C.) | 0.175 | — | 0.189 | 0.053 | 0.064 | 0.088 | 0.039 | — | — | 0.608 |
| Test solution II | 0 day | — | 0.042 | — | 0.019 | 0.011 | — | 0.17 | 0.019 | — | 0.261 |
| | Intermediate condition (30° C./65% RH) one month | — | 0.117 | — | 0.018 | 0.011 | — | 0.169 | 0.018 | — | 0.333 |
| | Accelerated condition (40° C./75% RH) one month | 0.005 | 0.792 | 0.02 | 0.018 | 0.012 | — | 0.173 | 0.018 | — | 1.038 |
| Test solution III of Example 1 | 0 day | — | — | — | — | 0.009 | 0.182 | — | — | — | 0.191 |
| | Accelerated condition (40° C./75% RH) six months | 0.082 | 0.892 | — | — | 0.009 | 0.219 | — | — | — | 1.202 |
| Test solution III of Example 3 | 0 day | — | 0.025 | — | — | — | 0.153 | — | — | — | 0.178 |
| | Accelerated condition (40° C./75% RH) six months | 0.063 | 0.852 | — | — | — | 0.194 | — | — | — | 1.109 |
| Test solution III of Example 8 | 0 day | — | 0.015 | — | — | — | 0.165 | — | — | — | 0.18 |
| | Accelerated condition (40° C./75% RH) six months | 0.074 | 0.812 | — | — | — | 0.201 | — | — | — | 1.087 |

Note:
— means not detected.

It can be seen from Table 2 that the immediate-release tablets of Examples 1, 3 and 8 of the present invention have good stability. The components of the other Examples are basically similar to the above three Examples, and the preparation process is similar, so it can be inferred that the other Examples also have good stability. In summary, the immediate-release tablets of the present invention have good stability and controllable quality.

Test Example 3 Dissolution Rate Test

The dissolution rate of the immediate-release tablets of Examples 1 to 8 and the tablets prepared in Comparative Example 1 were determined, respectively. The absorbance was measured by an ultraviolet spectrophotometer, and the dissolution rate was calculated respectively according to the external standard method as follows:

6 tablets were tested at 37° C. in 900 mL of 0.1N HCl medium using basket method (75 rpm). 10 mL of sample was collected at 5, 10, 15, 20, 30, 45, and 60 minutes, respectively, followed by refilling 10 mL of the medium. The sample was diluted 40 folds, and detected by UV-Vis spectrophotometer at 243 nm wavelength. 5 mg of API was added to a 100 mL volumetric flask, followed by the addition of the above 0.1N HCl medium. The resulting mixture was ultrasonicated to dissolve, and diluted to the constant volume. The resulting solution was diluted 5 folds as a reference substance, and detected by UV-Vis spectrophotometer at 243 nm wavelength.

Figure 1:
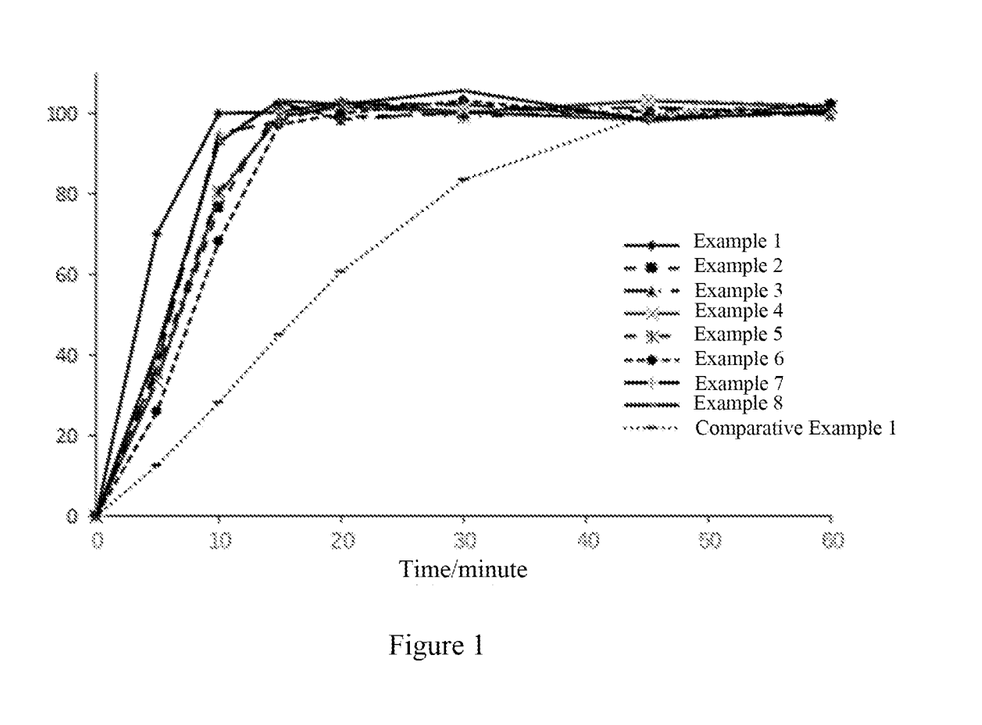
FIG. 1 is the dissolution profile of the immediate-release tablets prepared in Examples 1 to 8 and the tablets of Comparative Example 1.

The dissolution rates of the immediate-release tablets of the present invention are shown in Table 3 below, and the dissolution profiles are shown in FIG. 1.

TABLE 3

Dissolution rate of the immediate-release tablets of Examples 1 to 8 and the tablets of Comparative Example 1

| | \multicolumn{8}{c|}{Medium/Sampling point Average dissolution rate (%) in 0.1N HCl medium at different time points} |
|---|---|---|---|---|---|---|---|---|
| Example | 0 | 5 min | 10 min | 15 min | 20 min | 30 min | 45 min | 60 min |
| Example 1 | 0.0 | 70 | 100.1 | 100.4 | 102.8 | 100.3 | 98.6 | 100.9 |
| Example 2 | 0.0 | 34.1 | 76.7 | 101.9 | 99.3 | 100.1 | 103.3 | 102.1 |
| Example 3 | 0.0 | 40.2 | 93.5 | 102.8 | 98.5 | 100.4 | 101.7 | 99.9 |
| Example 4 | 0.0 | 33.5 | 79.8 | 99.4 | 101.6 | 100.5 | 103.1 | 101.7 |
| Example 5 | 0.0 | 35.8 | 80.7 | 99.3 | 102.2 | 99.3 | 100.7 | 101.7 |

TABLE 3-continued

Dissolution rate of the immediate-release tablets of Examples
1 to 8 and the tablets of Comparative Example 1

Medium/Sampling point
Average dissolution rate (%) in 0.1N HCl medium at different time points

| Example | 0 | 5 min | 10 min | 15 min | 20 min | 30 min | 45 min | 60 min |
|---|---|---|---|---|---|---|---|---|
| Example 6 | 0.0 | 25.9 | 68.1 | 97.2 | 100.2 | 103.3 | 98.8 | 102.3 |
| Example 7 | 0.0 | 37.4 | 95.0 | 98.4 | 102.5 | 102.4 | 99.3 | 100.1 |
| Example 8 | 0.0 | 41.3 | 93.0 | 103.2 | 102.5 | 105.8 | 98.1 | 101.2 |
| Comparative Example 1 | 0.0 | 12.7 | 28.3 | 45.1 | 60.7 | 83.4 | 99.8 | 102.1 |

The dissolution test of Comparative Examples 2, 3 and 4 was not carried out because of quality problems during the preparation process. Regarding to Comparative Example 2, the surface of the tablet bulged and peeled off during coating, and the appearance was unqualified. Regarding to Comparative Example 3, the friability during tableting was unqualified. Regarding to Comparative example 4, punch jamming occurred during tableting, and the surface of the tablet was unqualified.

It can be seen from the above Table 3 and FIG. 1 that the dissolution profiles of the immediate-release tablets of Examples 1 to 8 are slightly different according to change of the components of the formulations, but they all meet the requirements of rapid release in vitro (the dissolution rate in 15 minutes is not less than 80% of the labeled amount). However, the total amount of the filler, the disintegrant and the binder in the formulation of Comparative Example 1 is too high, which causes the dissolution of the product to be much slower than that of Examples 1 to 8, failing to achieve the desired rapid release (the dissolution rate in 15 minutes is not less than 80% of the labeled amount).

Test Example 4 Pharmacokinetic Test

Animal PK experiment was performed with the immediate-release tablets prepared in Examples 1, 3 and 7. The experimental method was single administration in beagle dog, wherein: Example 1 was administered in the fasting state along with feeding of 20 mL of water; Example 3 was administered along with a low-fat diet; and there were two conditions for Example 7, one was administered along with a low-fat diet and the other was administered along with a high-fat diet.

Specific Experimental Method:

Animal information: Beagle dogs, n=3, Beijing Marshall Biotechnology Co., Ltd.

Animal dietary status: Animals were fasted overnight before administration, and had free access to water during the experiment, other dietary status was determined according to the grouping scheme.

Sample collection: On the day of the experiment, 0.5 mL of blood was collected from the jugular vein before the administration and at the time points of 0.083, 0.25, 0.5, 0.75, 1, 1.5, 2, 2.5, 4, 6, 8, 10, and 12 h after the administration, respectively. The collected whole blood samples were placed in EDTA-K2 anticoagulant tubes.

Sample processing: The sample was centrifuged for 10 minutes to separate plasma, and the upper plasma sample was collected into a sample tube.

Sample formulation: 200 µL of acetonitrile ACN (Honeywell, USA) containing 5 ng/mL verapamil (China Institute for Food and Drug Control) and 50 ng/mL glyburide (China Institute for Food and Drug Control) was added to 20 µL of plasma collected at each time point above to precipitate protein. The mixture was vortexed for 10 minutes, and centrifuged at 3700 rpm for 8 minutes. 70 µL of water was added to 70 µL of the resulting supernatant, and the mixture was vortexed for 10 minutes. An aliquot of 20 µL of the mixture was injected into an LC-MS/MS (Qtrap 5500, AB SCIEX, USA) system for detection.

Example 1 group: The animals were fasted overnight before the administration; on the day of the administration, the animals resumed feeding 4 hours after the administration; during the experiment, the animals had free access to water.

Example 3 group: The animals were fasted overnight before the administration; during the experiment, the animals had free access to water; each animal was given about 150 mL of liquid food (prepared by homogenizing dog food: dog drinking water=30 g: 120 mL) by gavage on the day of the administration; the animals were fed normally 6 hours after the administration.

Example 7 low-fat diet group: The animals were fasted overnight before the administration; during the experiment, the animals had free access to water; each animal was given about 150 mL of liquid food (prepared by homogenizing dog food: dog drinking water=30 g: 120 mL) by gavage on the day of the administration; the animals were fed normally 6 hours after the administration.

Example 7 high-fat diet group: The animals were fasted overnight before the administration; during the experiment, the animals had free access to water; each animal was given about 150 mL of liquid food (prepared by homogenizing dog food:olive oil:dog drinking water=30 g:28 mL:120 mL) by gavage on the day of the administration; the animals were fed normally 6 hours after the administration.

Figure 2:
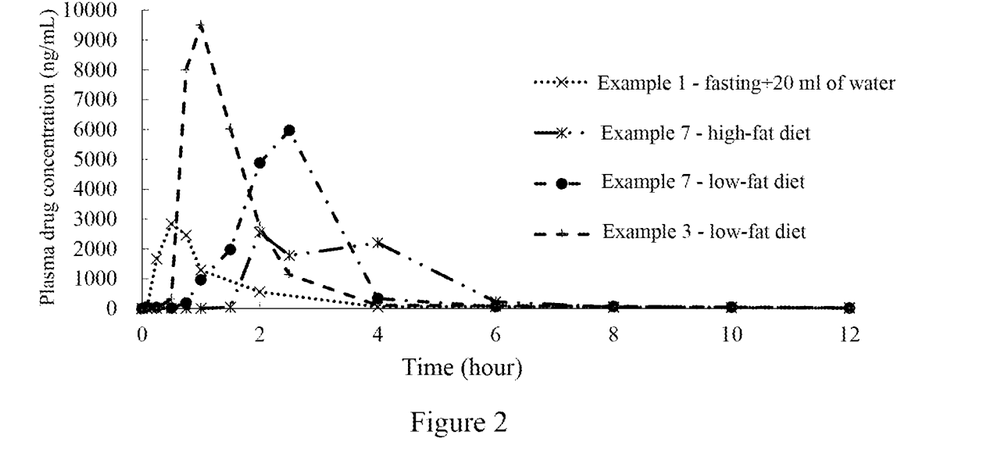
FIG. 2 is the pharmacokinetic profile of the immediate-release tablets prepared in Examples 1, 3 and 7.

The obtained pharmacokinetic parameters are shown in Table 4 below, and the pharmacokinetic profiles are shown in FIG. 2.

TABLE 4

Pharmacokinetic parameters of the immediate-release tablets of the present invention

| | Example | | | |
|---|---|---|---|---|
| PK parameter | Example 1 Fasting + 20 mL water | Example 3 Low-fat | Example 7 Low-fat | Example 7 High-fat |
| $T_{max}$ h | 0.67 | 1.00 | 2.25 | 3.00 |
| $C_{max}$ ng · mL$^{-1}$ | 3170 | 9500 | 6790 | 3830 |
| $AUC_{0-t}$ ng · h · mL$^{-1}$ | 3770 | 11900 | 10800 | 7590 |
| $AUC_{0-inf}$ ng · h · mL$^{-1}$ | 3850 | 11900 | 10800 | 7700 |
| Bioavailability % | 34.20 | 105.7 | 95.9 | 68.4 |

TABLE 4-continued

Pharmacokinetic parameters of the immediate-release tablets of the present invention

| PK parameter | Example 1 Fasting + 20 mL water | Example 3 Low-fat | Example 7 Low-fat | Example 7 High-fat |
|---|---|---|---|---|
| (vs. nitroxoline) | | | | |

Note:
The nitroxoline prodrug will be converted into nitroxoline when it enters the body; after intravenous injection of nitroxoline prodrug in beagle dogs, the $AUC_{0-inf}$ converted to the same dose was 11258 ng · h · mL$^{-1}$; the absolute bioavailability in beagle dogs is obtained by dividing the value of the above Example by the value of the intravenous injection.
It can be found from the PK profiles in FIG. 2 that the $T_{max}$ of Example 1 fasting, Example 3 and Example 7 low-fat is short, indicating that the drug can quickly enter the body of the beagle dogs. The $T_{max}$ of Example 7 high-fat is relatively long (3 h), the main reason is that adding water in Example 1 will promote the absorption of the drug, which may be related to the dissolution of the drug. In addition, high fat in Example 7 affects drug absorption time and $C_{max}$ (maximum plasma concentration). Combined with the aforementioned in vitro dissolution data and beagle dog PK data as a whole, the immediate-release tablets of the present invention can have a good effect of rapid action.
The immediate-release tablets of the present invention can be rapidly absorbed by patients after oral administration ($T_{max}$ = 0.67 to 3 hours), and the bioavailability is high, even up to more than 90%.
The preferred embodiments of the present invention have been described above in detail, however, the present invention is not limited thereto. Within the scope of the technical concept of the present invention, various simple modifications can be made to the technical solution of the present invention, including combining various technical features in any other suitable manner. These simple modifications and combinations are also regarded as the contents disclosed by the present invention, and all belong to the protection scope of the present invention.

What is claimed is:

1. A nitroxoline prodrug-containing coated tablet, characterized by comprising the following components in parts by weight: 100 parts by weight of an active pharmaceutical ingredient, 22.5 to 320 parts by weight of a filler, 0 to 40 parts by weight of a disintegrant, 0 to 95 parts by weight of a binder, and 2 to 30 parts by weight of a lubricant; the filler, the disintegrant and the binder are present in a total amount of 54 to 345 parts by weight per 100 parts by weight of the active pharmaceutical ingredient; and the active pharmaceutical ingredient is (S)-(5-nitroquinolin-8-yloxy)methyl 1-isopropionylpyrrolidine-2-carboxylate;

the filler is one or more selected from the group consisting of pregelatinized starch, lactose, mannitol and microcrystalline cellulose;

the disintegrant is one or two selected from the group consisting of croscarmellose sodium and crospovidone;

the binder is one or more selected from the group consisting of hydroxypropyl methyl cellulose, povidone and starch;

the lubricant is one or two selected from the group consisting of sodium stearyl fumarate and sodium lauryl sulfonate; and the ratio of the mass of the coating agent in the coated tablet to the mass of the uncoated plain tablet is 2% to 4%.

2. The nitroxoline prodrug-containing coated tablet according to claim 1, characterized in that;

the filler is present in an amount of 50 to 320 parts by weight per 100 parts by weight of the active pharmaceutical ingredient;

and/or, the disintegrant is present in an amount of 15 to 35 parts by weight per 100 parts by weight of the active pharmaceutical ingredient;

and/or, the binder is present in an amount of 10 to 50 parts by weight per 100 parts by weight of the active pharmaceutical ingredient;

and/or, the filler, the disintegrant and the binder are present in a total amount of 100 to 320 parts by weight per 100 parts by weight of the active pharmaceutical ingredient.

3. The nitroxoline prodrug-containing coated tablet according to claim 1, characterized in that the lubricant is present in an amount of 2 to 10 parts by weight per 100 parts by weight of the active pharmaceutical ingredient.

4. The nitroxoline prodrug-containing coated tablet according to claim 1, characterized in that the coated tablet further comprises one or more selected from the group consisting of colorant, pH adjuster, surfactant, stabilizer and fragrance.

5. A nitroxoline prodrug-containing coated tablet, characterized in that the coated tablet comprises the following components in parts by weight: 100 parts by weight of an active pharmaceutical ingredient, 22.5 to 320 parts by weight of a filler, 15 to 17 parts by weight of a disintegrant, and 2 to 10 parts by weight of a lubricant; the filler and the disintegrant are present in a total amount of 100 to 120 parts by weight per 100 parts by weight of the active pharmaceutical ingredient; and the active pharmaceutical ingredient is (S)-(5-nitroquinolin-8-yloxy)methyl 1-isopropionylpyrrolidine-2-carboxylate;

the filler is a mixture of pregelatinized starch, mannitol and microcrystalline cellulose, and the weight ratio of the three is 0.5-2:1:0.5-2; the disintegrant is crospovidone; and the lubricant is sodium stearyl fumarate;

the ratio of the mass of the coating agent in the coated tablet to the mass of the uncoated plain tablet is 2% to 4%.

6. The nitroxoline prodrug-containing coated tablet according to claim 5, characterized in that the tablet does not comprise a binder.

7. The nitroxoline prodrug-containing coated tablet according to claim 5, wherein the filler is present in an amount of 60 to 300 parts by weight.

8. The nitroxoline prodrug-containing coated tablet according to claim 5, wherein the weight ratio of pregelatinized starch, mannitol and microcrystalline cellulose in the filler is 0.8-1.3:1:0.8-1.3.

9. The nitroxoline prodrug-containing coated tablet according to claim 5, wherein the lubricant is present in an amount of 2 to 8 parts by weight.

10. The nitroxoline prodrug-containing coated tablet according to claim 5, wherein the filler is present in an amount of 90.8-93 parts by weight, and the weight ratio of pregelatinized starch, mannitol and microcrystalline cellulose in the filler is 1.06-1.07:1:1.09-1.25; and the lubricant is present in an amount of 2 to 2.1 parts by weight.

11. A preparation method for the nitroxoline prodrug-containing coated tablet according to claim 1, the preparation method comprising:

1) preparing granules by dry granulation which comprises the following steps of:

S1: mixing the other components except the lubricant to obtain mixture I; and

S2: mixing the mixture I with the lubricant;

or, when the coated tablet comprises a binder, preparing granules by wet granulation which comprises the following steps of:

S1: mixing the other components except the lubricant or the binder with a solution comprising the binder, and subjecting the resulting mixture to wet milling, drying and dry milling to obtain dry granules; and S2: mixing the dry granules with the lubricant;
or,
when the coated tablet does not comprise a binder, preparing granules by wet granulation which comprises the following steps of:
S1: mixing the other components except the lubricant with water, and subjecting the resulting mixture to wet milling, drying and dry milling to obtain dry granules; and
S2: mixing the dry granules with the lubricant;
2) compressing the resulting granules into tablets to obtain the coated tablet.

12. A method for treating an infectious disease or cancer in a subject in need thereof, the method comprising administering to the subject a therapeutically effective amount of the nitroxoline prodrug-containing coated tablet according to claim 1.

13. The method according to claim 12, wherein the infectious disease is urinary tract infection, and the cancer is bladder cancer.

* * * * *